Dec. 27, 1927.
A. C. ALEXANDER ET AL
1,653,688
GASOLINE GAUGE
Filed July 30, 1923
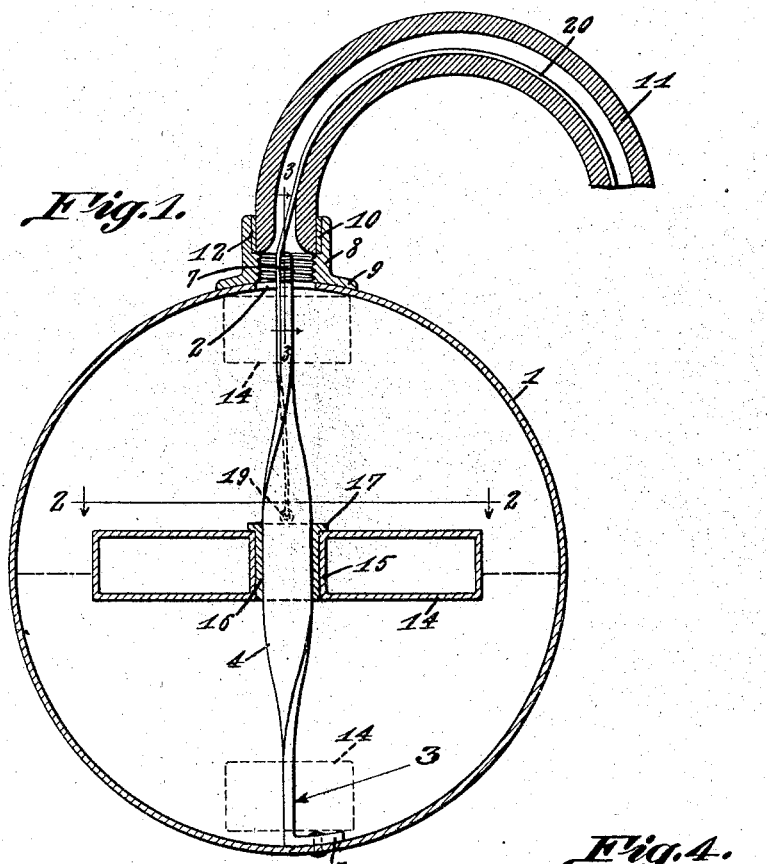
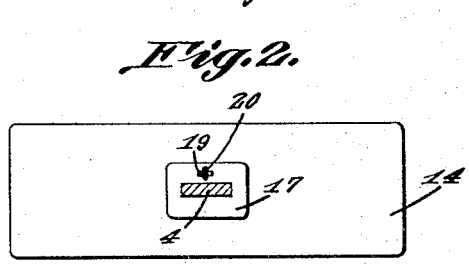
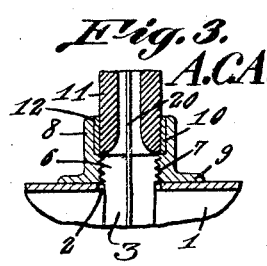
A. C. Alexander and O. K. Hagen, Inventors
Attorneys Patented Dec. 27, 1927.

1,653,688

UNITED STATES PATENT OFFICE.

ALFRED C. ALEXANDER AND OLE K. HAGEN, OF BELOIT, WISCONSIN.

GASOLINE GAUGE.

Application filed July 30, 1923. Serial No. 654,747.

This invention aims to provide novel means for mounting a float in a tank, so that the float will operate steadily in the tank. Another object of the invention is to provide novel means for attaching the operating member or flexible element to the float and for holding the bushing in the float. Another object of the invention is to provide novel means for mounting in the tank, the guide on which the float reciprocates.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:

Figure 1 shows in transverse section, a device constructed in accordance with the invention; Figure 2 is a plan of the float, the guide appearing in section, Figure 2 being a section on the line 2—2 of Figure 1; Figure 3 is a section on the line 3—3 of Figure 1; Figure 4 shows the means for connecting the bushing with the float.

In the accompanying drawings the numeral 1 marks a tubular tank, which often is of elongated cylindrical form, such a tank being used on motor propelled vehicles to hold the fuel for the engine. In the top of the tank 1, an opening 2 is formed. A vertical guide 3 is located in the tank 1, and is provided with a twist 4. The lower end of the guide 3 is secured as at 5 to the bottom of the tank 1. The upper end 6 of the guide 3 extends upwardly and outwardly through the opening 2 in the tank 1 and is provided at its edges with threads 7, engaging a holder 8, preferably in the form of a socket, the holder thus being caused to bear against the outer surface of the tank 1 at the top thereof, the holder having a flange 9 which engages the tank 1 about the opening 2, as is clearly evident from Figures 1 and 3. In the upper end of the holder or socket 8, a recess 10 is formed, one end of an elbow 11 being secured at 12 in the recess 10.

The numeral 14 marks an elongated hollow float provided with a central tube 15 within which is located a bushing 16 of antifriction material, the bushing being provided at its upper end with an outstanding flange 17 overlapping the upper surface of the float 14. At the place of juncture between the tube 15 of the float and the top of the float a boss 18 is formed, as shown in Figure 4. A securing element 19 such as a screw eye, passes downwardly through the flange 17 of the bushing 16 and enters the boss 18 of the float 14, the securing element serving to hold the bushing 16 in place in the tube 15 of the float. The securing element 19 has another function in that the lower end of a flexible element or operating member 20 is connected thereto, the flexible element passing upwardly through the elbow 11 and serving as a support for the float 14. The guide 3, further, acts not only as a guide for the float 14, but, as well acts as a guide for the flexible element 20 as indicated in Figure 1. Since the guide 3 passes through the anti-friction bushing 16, the sliding movement of the float on the guide is facilitated. Owing to the twisted form of the guide 3, the float will be held steady within the tank 1. The twist 4 of the guide 3 is such that when the float 14 is at the bottom of the tank 1, as shown in dotted line in Figure 1, the float extends lengthwise of the tank. By the time that the float 14 has risen to a point mid-way between the top and bottom of the tank, as shown in solid line in Figure 1, the float projects cross-wise of the tank, and when the float 14 has risen to the top of the tank, the float again extends lengthwise of the tank. The elongated form of the float 14 facilitates the insertion of the float into the tank through the ordinary opening (not shown), whereby gasoline is introduced into the tank. Notwithstanding the elongated form of the float, the twist 4 of the guide 3 is such, as hereinbefore explained, that the float does not come into contact with the side walls of the tank when the float approaches an extreme upper position or an extreme lower position.

What is claimed is:

In a device of the class described, a cylindrical tank, an elongated float located in the tank, a spiral guide in the tank, means for mounting the float on the guide for rotation and for movement longitudinally of the guide, the spiral of the guide being so shaped that when the float is at the limits of its up and down movements, the axis of the float will be in the same plane with the axis of the tank, and an operating member connected with the float.

In testimony that we claim the foregoing as our own, we have hereto affixed our signatures.

ALFRED C. ALEXANDER.
OLE K. HAGEN.